US009541568B2

(12) United States Patent
Braman et al.

(10) Patent No.: US 9,541,568 B2
(45) Date of Patent: Jan. 10, 2017

(54) SYSTEMS AND METHODS FOR ISOLATED SENSOR DEVICE PROTECTION

(71) Applicant: Honeywell International Inc., Morristown, NJ (US)

(72) Inventors: Todd L Loren Braman, New Brighton, MN (US); Owen D. Grossman, Golden Valley, MN (US); Matthew Schlager, Maplewood, MN (US); Jason Daniel Graham, White Bear Lake, MN (US); Timothy J. Hanson, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 31 days.

(21) Appl. No.: 14/509,897

(22) Filed: Oct. 8, 2014

(65) Prior Publication Data

US 2016/0103145 A1    Apr. 14, 2016

(51) Int. Cl.
*G01D 11/24* (2006.01)
*G01P 1/02* (2006.01)
*G01C 19/5783* (2012.01)
*G01P 1/00* (2006.01)

(52) U.S. Cl.
CPC ........... *G01P 1/023* (2013.01); *G01C 19/5783* (2013.01); *G01P 1/003* (2013.01)

(58) Field of Classification Search
CPC .......... G01D 11/24; G01D 11/245; G01P 1/02
USPC ........................................................ 73/431
See application file for complete search history.

(56) References Cited

U.S. PATENT DOCUMENTS

| | | | |
|---|---|---|---|
| 2,919,882 A | 1/1960 | Barkalow | |
| 6,565,061 B1 | 5/2003 | Petersen et al. | |
| 8,276,446 B2 * | 10/2012 | Ulm | B81B 7/0012 73/430 |
| 2004/0150144 A1 * | 8/2004 | Goepfert | F16F 1/3735 267/136 |

(Continued)

FOREIGN PATENT DOCUMENTS

| | | | |
|---|---|---|---|
| EP | 1788277 | 5/2007 | |
| EP | 2131151 A1 * | 12/2009 | ............. G01C 21/16 |
| EP | 2154393 A2 * | 2/2010 | ............. F16F 15/046 |

OTHER PUBLICATIONS

Maximum Motorsports, "Apr. 1979 Ford Mustang Maximum Motorsports Rear Solid Axle Pinion Snubber", "Retrieved Sep. 3, 2014 from http://www.latemodelrestoration.com/item/MM-MMPS/79-04-Mustang-Maximum-Motorsports-Solid-Axle-Pinion-Snubber", , pp. 1-7.

(Continued)

*Primary Examiner* — Lisa Caputo
*Assistant Examiner* — Jamel Williams
(74) *Attorney, Agent, or Firm* — Fogg & Powers LLC (57) ABSTRACT

Systems and methods for isolated sensor device protection are provided. In one embodiment, an isolated sensor device comprises: a housing having an isolation chamber; an isolator sealed within the isolation chamber; an inertial sensor assembly sealed within the isolation chamber, the inertial sensor assembly coupled to an inner surface of the isolation chamber by the isolator; and at least one progressive impact interface applied to a periphery of the inertial sensor assembly, wherein the at least one progressive impact interface extends outward from the inertial sensor assembly towards the inner surface.

18 Claims, 5 Drawing Sheets

(56) References Cited

U.S. PATENT DOCUMENTS

| | | | |
|---|---|---|---|
| 2007/0113702 A1* | 5/2007 | Braman | F16F 15/08 |
| | | | 74/574.4 |
| 2009/0260226 A1 | 10/2009 | Tinguely et al. | |
| 2009/0282894 A1* | 11/2009 | Grossman | G01C 21/16 |
| | | | 73/1.79 |
| 2010/0059911 A1* | 3/2010 | Goepfert | F16F 15/0232 |
| | | | 267/140.11 |
| 2010/0257932 A1* | 10/2010 | Braman | G01P 1/023 |
| | | | 73/493 |
| 2013/0068017 A1 | 3/2013 | Perkins et al. | |
| 2014/0001687 A1* | 1/2014 | Braman | F16F 15/08 |
| | | | 267/141.2 |
| 2014/0085778 A1 | 3/2014 | Braman et al. | |

OTHER PUBLICATIONS

"Taylor Made Transom Fender", "retrieved Sep. 3, 2014 from http://www.westmarine.com/but/taylor-made-transom-fender--2630424", , pp. 1-2.

European Patent Office, "Extended European Search Report from EP Application No. 15179527.5 mailed Mar. 21, 2016", "from Foreign Counterpart of U.S. Appl. No. 14/509,897", Mar. 21, 2016, pp. 1-9, Published in: EP.

* cited by examiner

SYSTEMS AND METHODS FOR ISOLATED SENSOR DEVICE PROTECTION

GOVERNMENT LICENSE RIGHTS

This invention was made with U.S. Government support under U.S. Government Contract Number 88MMSMJ01 awarded by the United States Navy. The U.S. Government has certain rights in the invention.

BACKGROUND

Inertial sensor systems used in guidance applications can experience high G environments, that include vibration, shock, and static events that require the use of sensor isolation systems. These isolation systems provide the inertial sensors with a limited freedom of movement within their housings in order to both protect the sensors and mitigate the influence of these forces on the navigation signal output produced by the inertial sensors. However, certain events can occur during operation that are beyond the capabilities of the sensor isolation system. For example, an extreme acceleration can cause the inertial sensors to move relative to their housing sufficiently to exhaust the available sway space within the housing. More specifically, the sensors "bottom out" and impact with the internal surface of their housing. The shock of such an impact produces extremely high, amplified, inputs to the isolated inertial sensor components. In many systems, these amplified events can cause sensor performance degradation as well as component damage which can result in a system failure. Techniques are available to reduce the magnitude of an amplified input by using pliable materials, such as elastomers, at expected contact points and planes. However, these techniques are limited and are mainly used for damage mitigation and don't provide sensor performance protection. These techniques are also mainly used during non-operating environments, such as component shipping or transportation, since they are limited in their ability to reduce the amplification needed to maintain acceptable sensor performance during operation.

For the reasons stated above and for other reasons stated below which will become apparent to those skilled in the art upon reading and understanding the specification, there is a need in the art for improved systems and methods

SUMMARY

The Embodiments of the present invention provide methods and systems for isolated sensor device protection and will be understood by reading and studying the following specification.

Systems and methods for isolated sensor device protection are provided. In one embodiment, an isolated sensor device comprises: a housing having an isolation chamber; an isolator sealed within the isolation chamber; an inertial sensor assembly sealed within the isolation chamber, the inertial sensor assembly coupled to an inner surface of the isolation chamber by the isolator; and at least one progressive impact interface applied to a periphery of the inertial sensor assembly, wherein the at least one progressive impact interface extends outward from the inertial sensor assembly towards the inner surface.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Explained in detail below, embodiments of the present disclosure provide systems and methods to protect isolated inertial sensors in up to 5 degrees of freedom during both operational and non-operational conditions.

Figure 1:
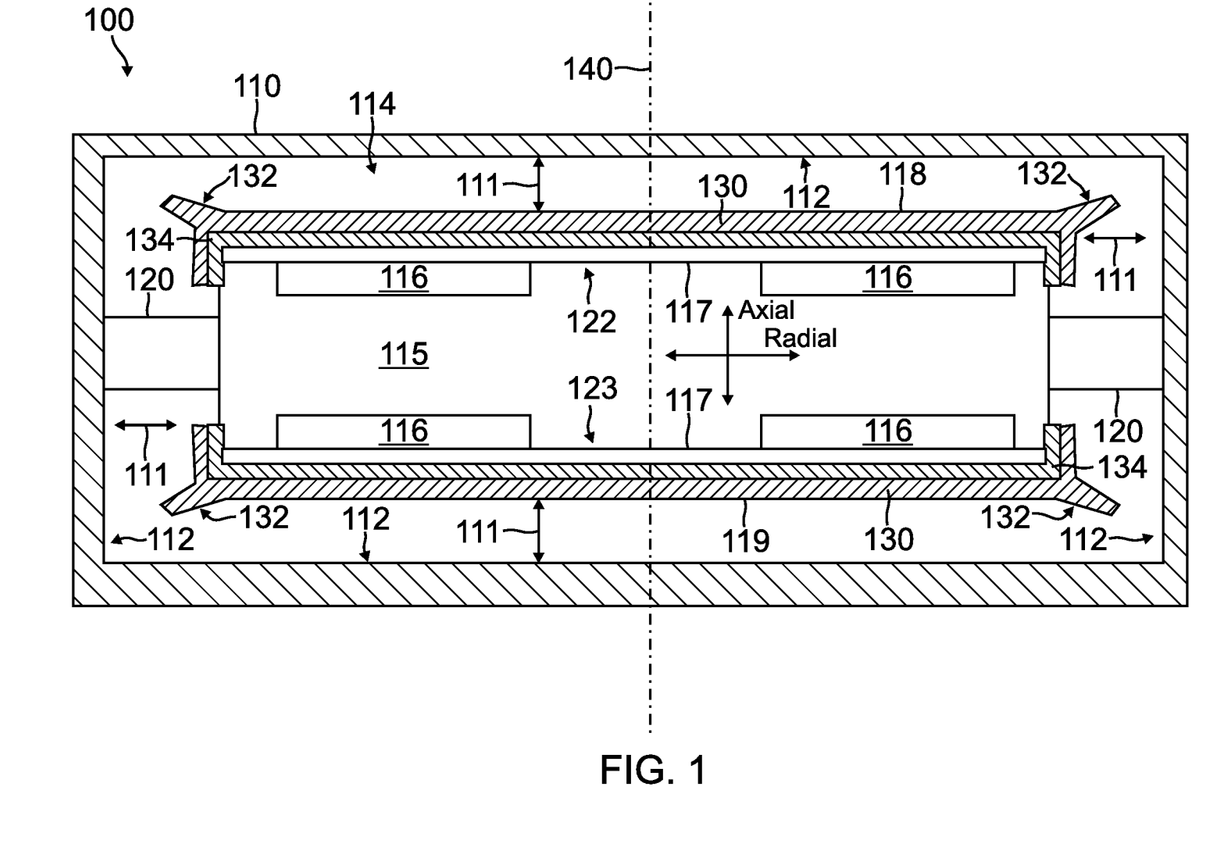
FIGS. 1 and 1A are diagrams illustrating an isolated sensor device of one embodiment of the present disclosure.

FIG. 1 is a diagram of an isolated sensor device 100 of one embodiment of the present disclosure. Isolated sensor device 100 comprises an isolated inertial sensor assembly (ISA) 115 sealed within a rigid housing 110. ISA is secured to the inner surface 112 of housing 110 by an isolator 120 (discussed further below) but is otherwise isolated on all sided from the inner surface 112 of housing 110 by a gap, referred to herein as "sway space" 111. The cavity in which the ISA 115, isolator 112 and sway space 111 are contained is referred to herein as isolation chamber 114.

More specifically, the ISA 115 is positioned within isolation chamber 114 and suspended in its position within the chamber by isolator 120. ISA 115 includes inertial sensors 116 such as accelerometers and/or gyroscope. In other embodiments, other instrumentation or sensors may be also be included within ISA 115. In one embodiment, the sensors 116 are mounted or otherwise integrated with a circuit board 117. In the embodiment shown in FIG. 1, a first circuit board 117 (shown at 122) comprising one or more inertial sensors 116 is secured to a first, or "upper", surface 118 of the ISA 115. A second circuit board 117 (shown at 123) comprises one or more inertial sensors 116 secured to an opposing second, or "bottom" surface 119 of the ISA 115. To mechanically protect the circuit boards 117 one or both may further comprise a shock ring 134 about its perimeter, as discussed in greater detail below. An axis 140 passes through the ISA 115 generally perpendicular to the upper and bottom surfaces 122 and 123, and defines the sensing axis relative to which the ISA 115 produces navigation data. As such, reference herein to the "axial" direction refer to a direction parallel to axis 140. Reference herein to the "radial" direction refer to a direction normal to axis 140.

The isolator 120 comprises one or more components composed of elastomer material that are disposed between the ISA 115 and the housing 110 and mechanically couple ISA 115 to the inner surface 112 of chamber 114 while maintaining sway space 111. Isolator 120 allows displacement (that is, relative motion) between the ISA 115 and the housing 110 and acts as a passive isolation system to absorb axial and radial motion related energy from housing 110 in order to reduce energy transfer from the housing 110 to the ISA 115.

Figure 1A:
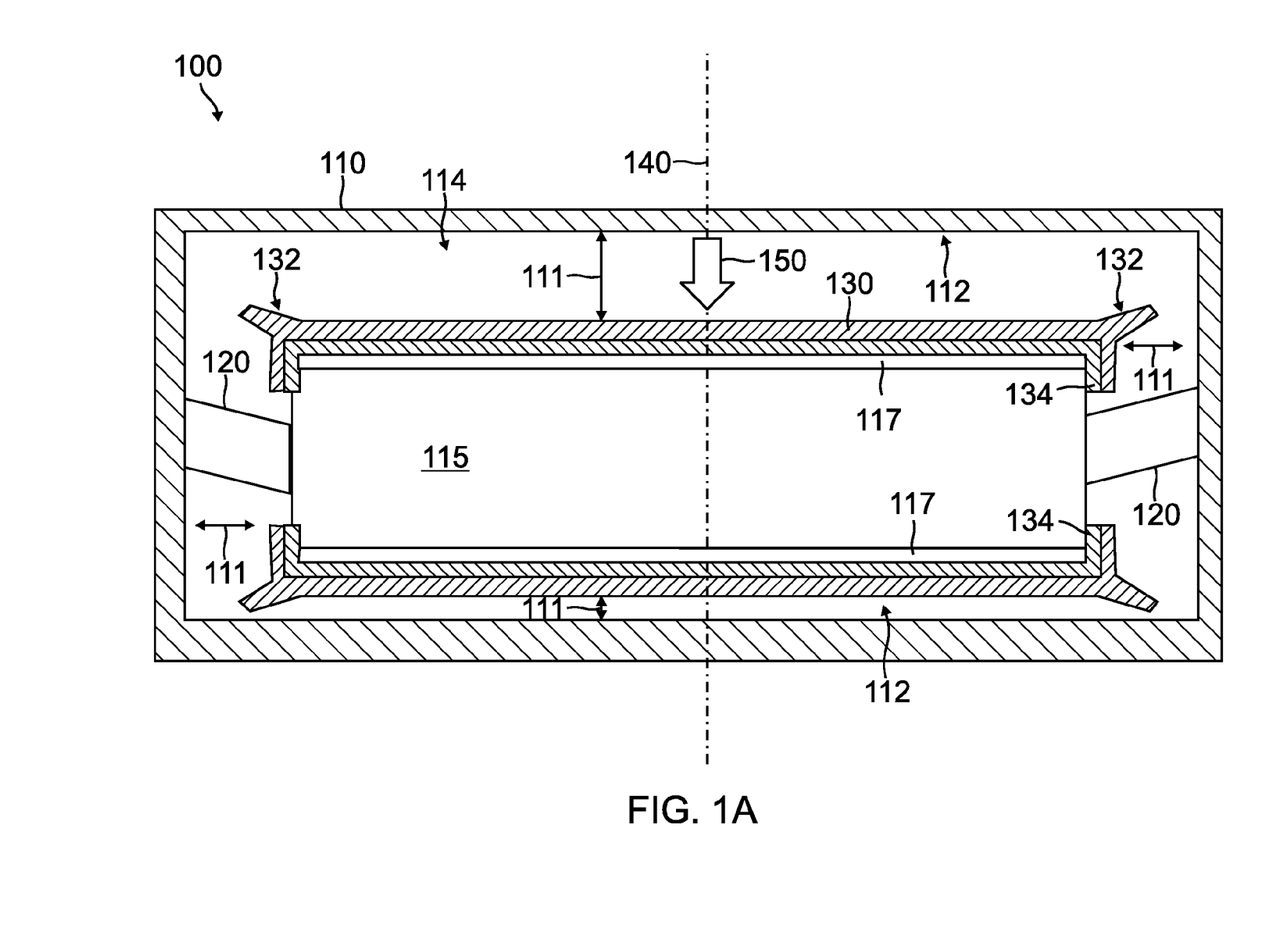

As illustrated by FIG. 1A, when sensor device 100 experiences an acceleration, counter inertial forces act upon ISA 115, causing a relative displacement of ISA 115 with respect to the housing 110. Under normal operation conditions, the isolator 120 flexes to allow some displacement of ISA 115 within sway space 111 while still maintaining separation between ISA 115 and the inner surface 112. A similar deflection can occur in the opposite direction due to the deceleration of device 110. During these deflections of ISA 115, shock ring 134 supports the periphery of circuit board 117, preventing further bending or displacement of portions of circuit board 117 due to the momentum of its own mass. However, during extreme acceleration events, such as during a missile launch event, sufficient inertial forces may act upon ISA 115 to cause ISA 115 to bottom-out within chamber 114. That is, under certain high acceleration conditions, ISA 115 may become sufficiently displaced within chamber 114 to exhaust the sway space 111 between itself and housing 110 and as a result impact with inner surface 112. In order to address accelerations sufficient to cause ISA 115 to exhaust its sway space 111, ISA 115 is equipped with one or more features referred to herein as progressive impact interfaces 132. The progressive impact interfaces 132 are features that each comprise an elastomer material 130 that functions to dampen impact forces on ISA 115 when it collides with the inner surface 112.

Each of the progressive impact interfaces 132 extend outward from ISA 115 towards the inner surface 112 and are positioned around the periphery of ISA 115 so that regardless of its direction of displacement, one of the progressive impact interfaces 132 will always be the first point of contact between ISA 115 and the inner surface 112 of housing 110. It should be noted that the term "progressive impact interface" as it is used in this disclosure is to be construed as meaning that the area of material 130 in contact between a progressive impact interface 132 and inner surface 112 progressively increases as the inertial forces on ISA 115 continue to further compress material 130 against inner surface 112. As the compression of progressive impact interface 132 continues, more of the elastomer material 130 becomes in direct contact with inner surface 112 and results in material 130 becoming increasingly stiff. This produces a progressively increasing counterforce from the compressed progressive impact interface 132 that dampens the force of impact. It should also be noted that the progressive impact interfaces 132 protect not only against linear accelerations in the axial or radial directions, but also against rotational accelerations that may cause impacts between inner surface 112 and diagonally opposing (i.e., catty-corner or kitty corner) edges of surfaces 118 and 119.

In this way, embodiments described by this disclosure protect the isolated system within ISA 115 from potential damage as well as optimizing sensor performance during and after an event. The shock of impact is dampened to below the threshold that would cause damage to sensors 116 and also distributed over a time span that mitigates the impact's effect on the navigation data outputs signal from ISA 115. Embodiments describe herein thus allow device 100 to be exposed to harsher non-operating and operating environments while maintaining both survivability and sensor performance. With improved performance over harsher environments, these embodiments also allows device 100 to be used on more platforms with increased confidence.

It should be noted from FIGS. 1 and 1A that having a greater clearance provided by sway space 111 gives the designer of device 100 more latitude in engineering both the size and shape of the feature geometry for progressive impact interfaces 132. A wider sway space 111 allows for less impact amplification and therefore use in harsher environments. However, it also can allow for higher velocities to be generated prior to initial contact. Thus the geometry of the progressive impact interfaces 132, along with the type of material needed for material 130, can be tuned to meet the performance requirements predicted for worst case events. Once the geometry is determined, material 130 can be molded, formed, machined, cut, stamped, or cast into the required shape with the proper material that will meet the system requirements.

Figure 2:
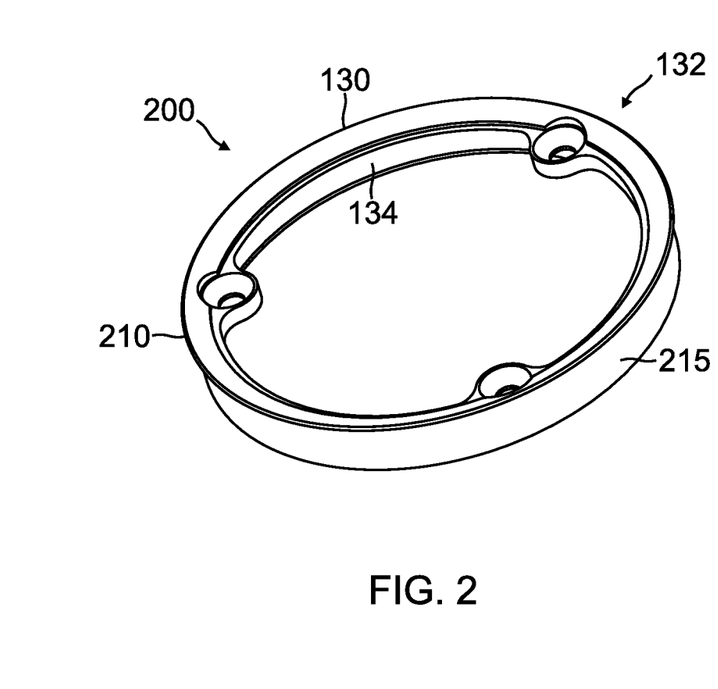
FIGS. 2 and 3 are diagrams illustrating a geometry for a progressive impact interface of one embodiment of the present disclosure.
Figure 3:
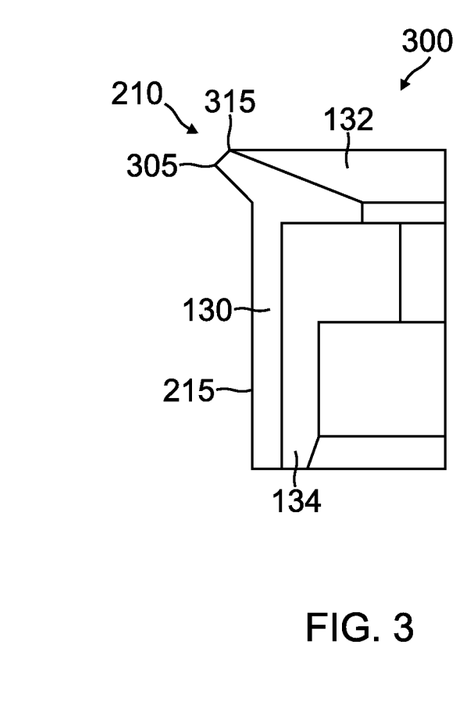

FIGS. 2 and 3 are diagrams illustrating a geometry of one embodiment of the present disclosure for a progressive impact interface 132. In this embodiment, shown generally at 200 in FIG. 2 and 300 in FIG. 3, progressive impact interface 132 is formed as a continuous ring of elastomer material 130 positioned around shock ring 134. In this embodiment, the progressive impact interface 132 is defined by an angular extended lip 210 that extends radially towards surface 112 beyond a base ring 215 of the elastomer material 130, and extends axially towards surface 112 beyond shock ring 134. At its point of maximum radial extension, angular extended lip 210 itself comprises a radial impact point 305 which, when ISA 115 exhausts sway space 110 radially, will be the first point of contact between progressive impact interface 132 and surface 112. Angular extended lip 210 also comprises an axial impact point 315 which, when ISA 115 exhausts sway space 111 axially, will be the first point of contact between progressive impact interface 132 and surface 112. It should be appreciated that when both axial and radial inertial force components are present, both the radial and axial impacts points 305 and 315 may collide with surface 112. In that case, the angular extended lip 210 itself comprises a wedge shape of material 130 increasing from impact points 305 and 315 towards shock ring 134 such that the area of contact between the material 130 and inner surface 112 will progressively increase as the inertial forces on ISA 115 continue to further compress material 130 against inner surface 112.

Figure 4:
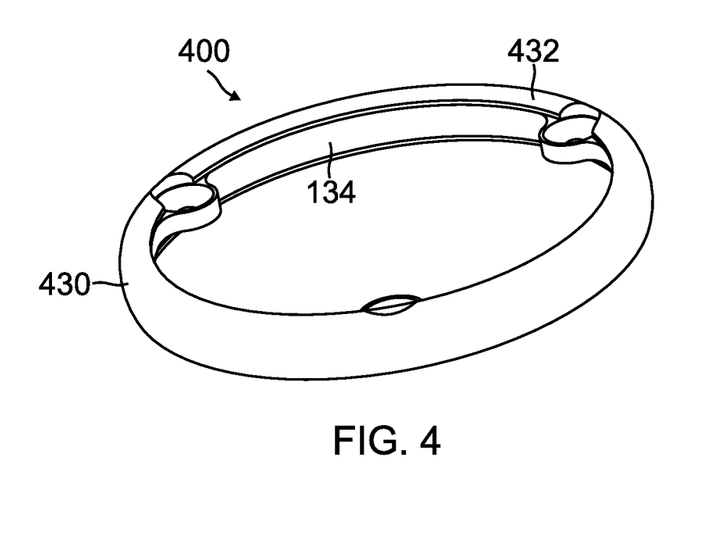
FIGS. 4 and 5 are diagrams illustrating another geometry for a progressive impact interface of one embodiment of the present disclosure.
Figure 5:
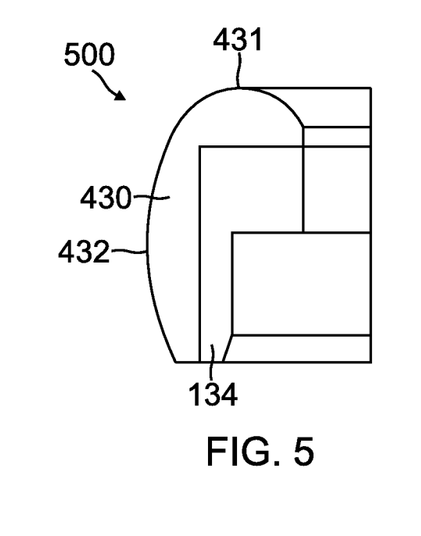

FIGS. 4 and 5 are diagrams illustrating another geometry of one embodiment of the present disclosure for progressive impact interface 132. In this embodiment, shown generally at 400 in FIG. 4 and 500 in FIG. 5, a progressive impact interface 432 is formed as a continuous ring of elastomer material 130 positioned around shock ring 134. However, in this embodiment, progressive impact interface 432 instead has a continuously curved outer surface 431 that extends both radially and axially beyond shock ring 134 towards inner surface 112. In this embodiment, any initial point of contact between the progressive impact interface 432 and surface 112 will be tangential to the continuously curved outer surface 431. Therefore, in the same manner as described above for in FIGS. 2 and 3, the area of contact between the continuously curved outer surface 431 and inner surface 112 will progressively increase as the inertial forces on ISA 115 continue to further compress material 430 against inner surface 112 and dampen impact forces on ISA 115 from its collision with the inner surface 112.

Figure 6:
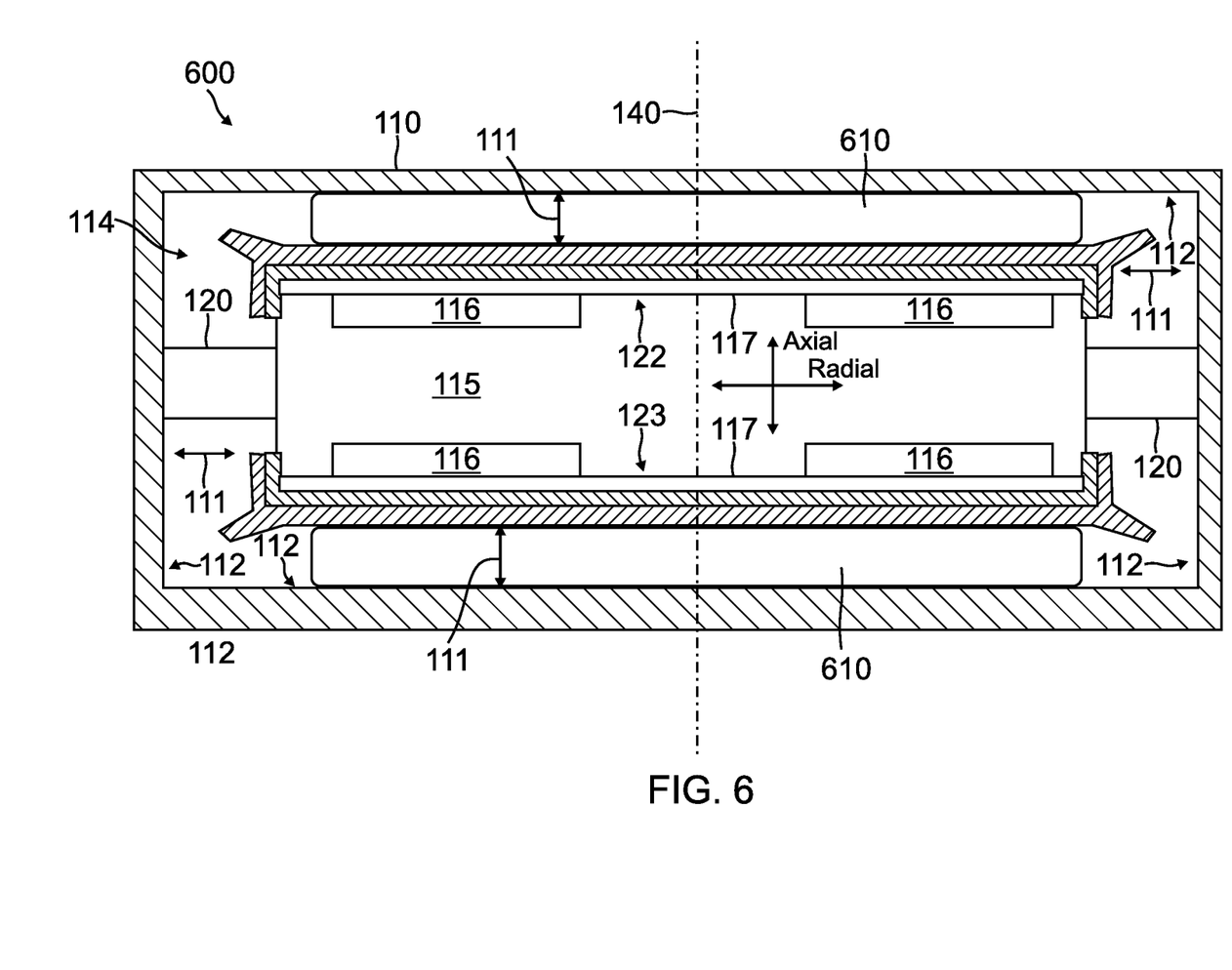
FIG. 6 is a diagram illustrating another isolated sensor device of one embodiment of the present disclosure.

FIG. 6 is a diagram illustrating at 600 another embodiment of device 100 that further comprises a sway space augmentation material 610 inserted within the sway space 111 between ISA 115 and the inner surface 112 of housing 110. In one embodiment, the sway space augmentation material 610 serves as a drop-in solution providing a snubber that functions as shock isolator, damping the high frequency high energy from transmitting to ISA 115 and damaging the sensors 116. The sway space augmentation material 610 can also aid in mitigating high acceleration events by preventing ISA 115 from impacting inner surface 112, or at least slow its rate of travel within isolation chamber 114. For example, in one embodiment, sway space augmentation material 610 compresses or collapses in response to the deflection of ISA 115 within chamber 114. In alternate embodiments, sway space augmentation material 610 may be fabricated from an elastomer or formed as an overmolded part. Also, in alternate embodiments, sway space augmentation material 610 could fill only a fraction of the available sway space 111, completely fill the sway space 111, or be placed into sway space 111 in a state of compression, depending on the desired dampening characteristics to be achieved. As such, the sway space augmentation material 610 could comprise a part made of a variety of materials and/or densities. Also, the diameter of sway space augmentation material 610 can be the same or possibly slightly larger (for a press-fit) than the volume it fits into, such that it is not easily dislodged, and has no lateral play within chamber 114.

Example Embodiments

Example 1 includes an isolated sensor device, the device comprising: a housing having an isolation chamber; an isolator sealed within the isolation chamber; an inertial sensor assembly sealed within the isolation chamber, the inertial sensor assembly coupled to an inner surface of the isolation chamber by the isolator; and at least one progressive impact interface applied to a periphery of the inertial sensor assembly, wherein the at least one progressive impact interface extends outward from the inertial sensor assembly towards the inner surface.

Example 2 includes the device of example 1, wherein the at least one progressive impact interface is positioned around the periphery of the inertial sensor assembly such that when the inertial sensor assembly experiences sufficient deflection within the isolation chamber to impact the inner surface, the progressive impact interface will be the first point of contact between the inertial sensor assembly and the inner surface.

Example 3 includes the device of any of examples 1-2, wherein the at least one progressive impact interface comprises a geometry, and is formed from a material, such that an area of the material in contact with the inner surface, starting from an initial contact area, progressively increases when inertial forces on the inertial sensor assembly continue to further compress the at least one progressive impact interface against the inner surface.

Example 4 includes the device of any of examples 1-3, wherein the inertial sensor assembly comprises: a circuit board that includes at least one of an accelerometer or a gyroscope; a shock ring mounted around a periphery of the circuit board; and wherein the at least one progressive impact interface comprises an elastomer material applied to at least part of the shock ring.

Example 5 includes the device of any of examples 1-4, wherein the at least one progressive impact interface comprises an angular extended lip that extends both radially and axially away from the inertial sensor assembly and towards the inner surface.

Example 6 includes the device of example 5, wherein the angular extended lip comprises a continuous ring of elastomer material about the periphery of the inertial sensor assembly.

Example 7 includes the device of any of examples 5-6, wherein the angular extended lip comprises a radial impact point which, when the inertial sensor assembly deflects such as to radially exhaust a sway space between the inertial sensor assembly and the inner surface, will be the first point of contact between the at least one progressive impact interface and the inner surface.

Example 8 includes the device of any of examples 5-7, wherein the angular extended lip comprises an axial impact point which, when the inertial sensor assembly deflects such as to axially exhaust a sway space between the inertial sensor assembly and the inner surface, will be the first point of contact between the at least one progressive impact interface and the inner surface.

Example 9 includes the device of any of examples 5-8, wherein the angular extended lip comprises a wedge shape of elastomer material.

Example 10 includes the device of any of examples 1-9, wherein the at least one progressive impact interface comprises a continuously curved outer surface that extends both radially and axially towards the inner surface.

Example 11 includes the device of example 10, wherein the continuously curved outer surface comprises a continuous ring of elastomer material about the periphery of the inertial sensor assembly.

Example 12 includes the device of any of examples 1-11, wherein the inertial sensor assembly is secured to the inner surface by the isolator but is otherwise isolated on all sides from the inner surface of the housing by a sway space.

Example 13 includes the device of example 12, wherein the sway space comprises an air gap.

Example 14 includes the device of any of examples 12-13, wherein at least a portion of the sway space comprises a sway space augmentation material configured to compress upon deflection of the inertial sensor assembly within the isolation chamber.

Example 15 includes an isolated sensor device, the device comprising: a housing having an isolation chamber; an isolator sealed within the isolation chamber; an inertial sensor assembly sealed within the isolation chamber, the inertial sensor assembly coupled to an inner surface of the isolation chamber by the isolator, wherein the inertial sensor assembly is secured to the inner surface by the isolator but is otherwise isolated on all sides from the inner surface of the housing by a sway space; and a sway space augmentation material occupying at least part of the sway space and configured to compress upon deflection of the inertial sensor assembly within the isolation chamber.

Example 16 includes the device of example 15, the sway space at least partially further comprising an air gap.

Example 17 includes the device of any of examples 15-16, further comprising: at least one progressive impact interface applied to a periphery of the inertial sensor assembly, wherein the at least one progressive impact interface extends outward from the inertial sensor assembly towards the inner surface.

Example 18 includes the device of example 17, wherein the at least one progressive impact interface is positioned around the periphery of the inertial sensor assembly such that when the inertial sensor assembly experiences sufficient deflection within the isolation chamber to impact the inner surface, the progressive impact interface will be the first point of contact between the inertial sensor assembly and the inner surface.

Example 19 includes the device of example 18, wherein the at least one progressive impact interface comprises a geometry, and is formed from a material, such that an area of the material in contact with the inner surface, starting from an initial contact area, progressively increases when inertial forces on the inertial sensor assembly continue to further compress the at least one progressive impact interface against the inner surface.

Example 20 includes the device of any of examples 17-19, wherein the inertial sensor assembly comprises: a circuit board that includes at least one of an accelerometer or a gyroscope; a shock ring mounted around a periphery of the circuit board; and wherein the at least one progressive impact interface comprises an elastomer material applied to at least part of the shock ring.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An isolated sensor device, the device comprising:
   a housing having an isolation chamber;
   an isolator sealed within the isolation chamber
   an inertial sensor assembly sealed within the isolation chamber, the inertial sensor assembly coupled to an inner surface of the isolation chamber by the isolator;
   at least one progressive impact interface applied to a periphery of the inertial sensor assembly, wherein the at least one progressive impact interface extends outward from the inertial sensor assembly towards the inner surface;
   wherein the at least one progressive impact interface comprises an angular extended lip that extends both radially and axially away from the inertial sensor assembly and towards the inner surface.

2. The device of claim 1, wherein the at least one progressive impact interface is positioned around the periphery of the inertial sensor assembly such that when the inertial sensor assembly experiences sufficient deflection within the isolation chamber to impact the inner surface, the progressive impact interface will be the first point of contact between the inertial sensor assembly and the inner surface.

3. The device of claim 2, wherein the at least one progressive impact interface comprises a geometry, and is formed from a material, such that an area of the material in contact with the inner surface, starting from an initial contact area, progressively increases when inertial forces on the inertial sensor assembly continue to further compress the at least one progressive impact interface against the inner surface.

4. The device of claim 1, wherein the inertial sensor assembly comprises:
   a circuit board that includes at least one of an accelerometer or a gyroscope;
   a shock ring mounted around a periphery of the circuit board; and
   wherein the at least one progressive impact interface comprises an elastomer material applied to at least part of the shock ring.

5. The device of claim 1, wherein the angular extended lip comprises a continuous ring of elastomer material about the periphery of the inertial sensor assembly.

6. The device of claim 1, wherein the angular extended lip comprises a radial impact point which, when the inertial sensor assembly deflects such as to radially exhaust a sway space between the inertial sensor assembly and the inner surface, will be the first point of contact between the at least one progressive impact interface and the inner surface.

7. The device of claim 1, wherein the angular extended lip comprises an axial impact point which, when the inertial sensor assembly deflects such as to axially exhaust a sway space between the inertial sensor assembly and the inner surface, will be the first point of contact between the at least one progressive impact interface and the inner surface.

8. The device of claim 1, wherein the angular extended lip comprises a wedge shape of elastomer material.

9. The device of claim 1, wherein the at least one progressive impact interface comprises a continuously curved outer surface that extends both radially and axially towards the inner surface.

10. The device of claim 9, wherein the continuously curved outer surface comprises a continuous ring of elastomer material about the periphery of the inertial sensor assembly.

11. An isolated sensor device, the device comprising:
    a housing having an isolation chamber;
    an isolator sealed within the isolation chamber
    an inertial sensor assembly sealed within the isolation chamber, the inertial sensor assembly coupled to an inner surface of the isolation chamber by the isolator;
    at least one progressive impact interface applied to a periphery of the inertial sensor assembly, wherein the at least one progressive impact interface extends outward from the inertial sensor assembly towards the inner surface;
    wherein the inertial sensor assembly is secured to the inner surface by the isolator but is otherwise isolated on all sides from the inner surface of the housing by a sway space; and
    wherein at least a portion of the sway space comprises a sway space augmentation material configured to compress upon deflection of the inertial sensor assembly within the isolation chamber.

12. The device of claim 11, wherein the sway space comprises an air gap.

13. An isolated sensor device, the device comprising:
    a housing having an isolation chamber;
    an isolator sealed within the isolation chamber;
    an inertial sensor assembly sealed within the isolation chamber, the inertial sensor assembly coupled to an inner surface of the isolation chamber by the isolator, wherein the inertial sensor assembly is secured to the inner surface by the isolator but is otherwise isolated on all sides from the inner surface of the housing by a sway space; and
    a sway space augmentation material occupying at least part of the sway space and configured to compress upon deflection of the inertial sensor assembly within the isolation chamber;
    wherein the inertial sensor assembly includes at least one progressive impact interface applied to a periphery of the inertial sensor assembly, wherein the at least one progressive impact interface comprises an angular extended lip that extends both radially and axially away from the inertial sensor assembly and towards the inner surface.

14. The device of claim 13, the sway space at least partially further comprising an air gap.

15. The device of claim 13, further comprising:
at least one progressive impact interface applied to a periphery of the inertial sensor assembly, wherein the at least one progressive impact interface extends outward from the inertial sensor assembly towards the inner surface.

16. The device of claim 15, wherein the at least one progressive impact interface is positioned around the periphery of the inertial sensor assembly such that when the inertial sensor assembly experiences sufficient deflection within the isolation chamber to impact the inner surface, the progressive impact interface will be the first point of contact between the inertial sensor assembly and the inner surface.

17. The device of claim 16, wherein the at least one progressive impact interface comprises a geometry, and is formed from a material, such that an area of the material in contact with the inner surface, starting from an initial contact area, progressively increases when inertial forces on the inertial sensor assembly continue to further compress the at least one progressive impact interface against the inner surface.

18. The device of claim 15, wherein the inertial sensor assembly comprises:
a circuit board that includes at least one of an accelerometer or a gyroscope;
a shock ring mounted around a periphery of the circuit board; and
wherein the at least one progressive impact interface comprises an elastomer material applied to at least part of the shock ring.

* * * * *